(12) United States Patent
Cavalleri et al.

(10) Patent No.: US 11,852,393 B2
(45) Date of Patent: Dec. 26, 2023

(54) VAPOR COMPRESSION REFRIGERATION SYSTEM CAPABLE OF OPERATING IN TRANSCRITICAL MODE AND METHOD OF OPERATING SUCH A SYSTEM

(71) Applicant: EPTA S.P.A., Milan (IT)

(72) Inventors: Paolo Cavalleri, Milan (IT); Mario De Bona, Milan (IT); Davide Bortoluzzi, Milan (IT); Daniele Mazzola, Milan (IT)

(73) Assignee: EPTA S.P.A., Milan (IT)

( * ) Notice: Subject to any disclaimer, the term of this patent is extended or adjusted under 35 U.S.C. 154(b) by 342 days.

(21) Appl. No.: 17/173,510

(22) Filed: Feb. 11, 2021

(65) Prior Publication Data
US 2021/0254864 A1 Aug. 19, 2021

(30) Foreign Application Priority Data

Feb. 14, 2020 (IT) .................. 102020000003019

(51) Int. Cl.
*F24F 11/32* (2018.01)
*F25B 27/00* (2006.01)
(Continued)

(52) U.S. Cl.
CPC .............. *F25B 6/02* (2013.01); *F24F 11/32* (2018.01); *F25B 5/00* (2013.01); *F25B 27/00* (2013.01);
(Continued)

(58) Field of Classification Search
CPC ............... F25B 27/00; F25B 2400/075; F25B 2400/16; F25B 2400/23; F25B 2400/04;
(Continued)

(56) References Cited

U.S. PATENT DOCUMENTS

| 2013/0298593 A1 | 11/2013 | Christensen |
| 2014/0326018 A1* | 11/2014 | Ignatiev ................. F25B 49/02 62/527 |

(Continued)

FOREIGN PATENT DOCUMENTS

| AU | 2016101310 A4 | 8/2016 |
| WO | 2009041959 A1 | 4/2009 |
| WO | 2017023632 A1 | 2/2017 |

OTHER PUBLICATIONS

Italian Search Report for IT Patent Application No. 202000003019, dated Oct. 14, 2020, 9 pages.

*Primary Examiner* — Jerry-Daryl Fletcher
*Assistant Examiner* — Daniel C Comings
(74) *Attorney, Agent, or Firm* — Armstrong Teasdale LLP

(57) ABSTRACT

A vapor compression refrigeration system has a main refrigerant circuit having a primary compressor group, a gas cooler or condenser, an expansion device, a liquid receiver, and at least one evaporator. An emergency circulation duct fluidically connects the liquid receiver to the main circuit to allow a flow of refrigerant from the liquid receiver to the gas cooler. An emergency compressor group in the emergency circulation duct is activatable when pressure inside the liquid receiver or in the duct upstream of the emergency compressor group meets or exceeds a predefined emergency pressure threshold. An uninterruptible power supply powers the emergency compressor group and expansion device during a shutdown of the refrigeration system. When pressure inside the liquid receiver or in the duct upstream of the emergency compressor group equals or exceeds the predefined emergency pressure threshold, an emergency circulation of refrigerant fluid is activated through the emergency circulation duct.

21 Claims, 7 Drawing Sheets

(51) Int. Cl.
    *F25B 6/02*           (2006.01)
    *F25B 41/22*         (2021.01)
    *F25B 41/34*         (2021.01)
    *F25B 5/00*           (2006.01)
    *F25B 39/00*         (2006.01)
    *F25B 49/02*         (2006.01)

(52) U.S. Cl.
    CPC .............. *F25B 39/00* (2013.01); *F25B 41/22* (2021.01); *F25B 41/34* (2021.01); *F25B 49/02* (2013.01); *F25B 2400/0401* (2013.01); *F25B 2400/0403* (2013.01); *F25B 2400/0409* (2013.01); *F25B 2400/075* (2013.01); *F25B 2500/27* (2013.01); *F25B 2600/2501* (2013.01); *F25B 2700/19* (2013.01)

(58) Field of Classification Search
    CPC ...... F25B 2400/0401; F25B 2400/0409; F25B 2400/05; F24F 11/32
    See application file for complete search history.

(56) References Cited

U.S. PATENT DOCUMENTS

2017/0102169 A1*   4/2017   Zimmermann ......... F25B 49/02
2018/0252440 A1*   9/2018   Zha ........................ F25B 40/02

\* cited by examiner

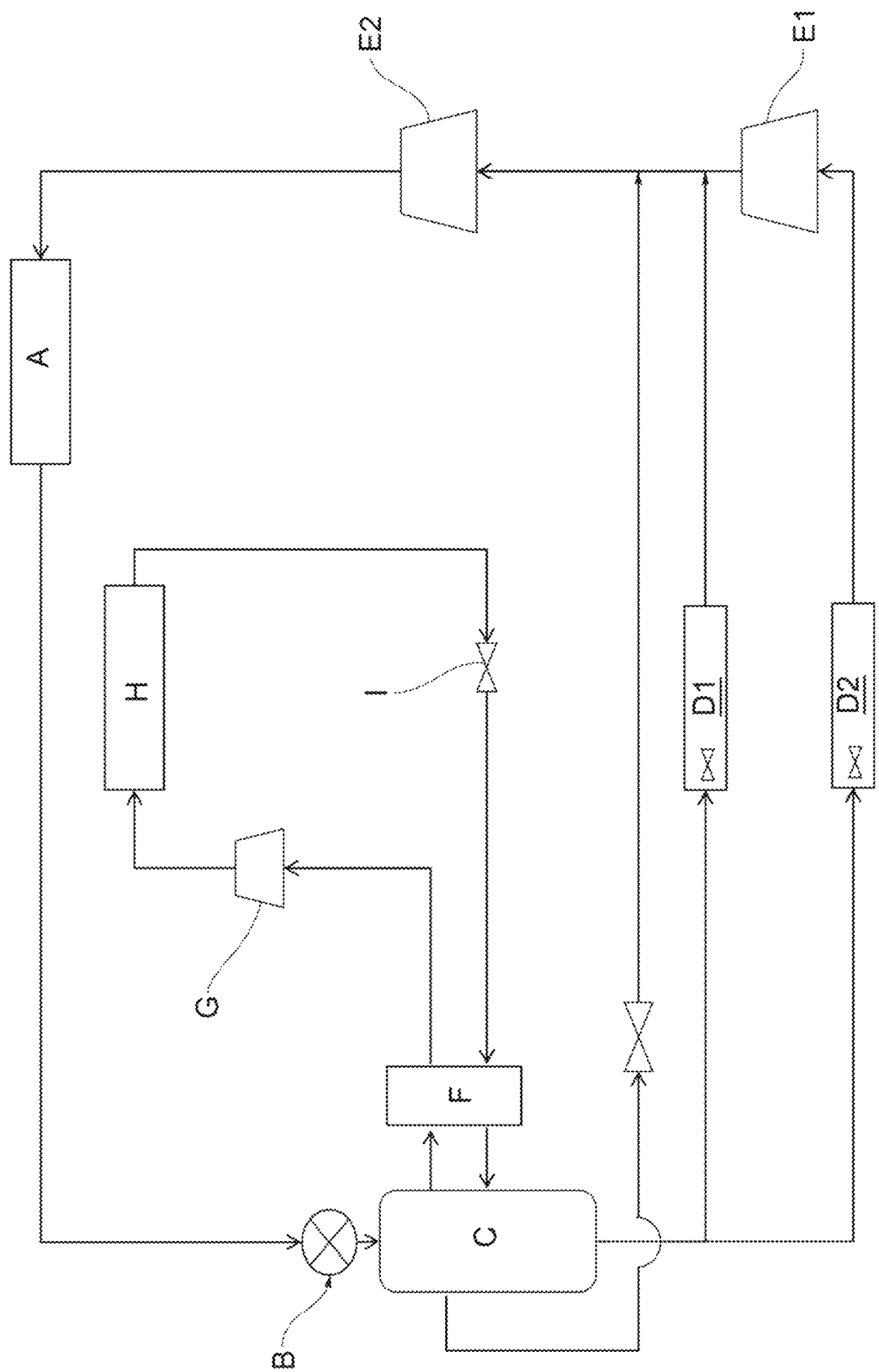
FIG.1 - Prior art

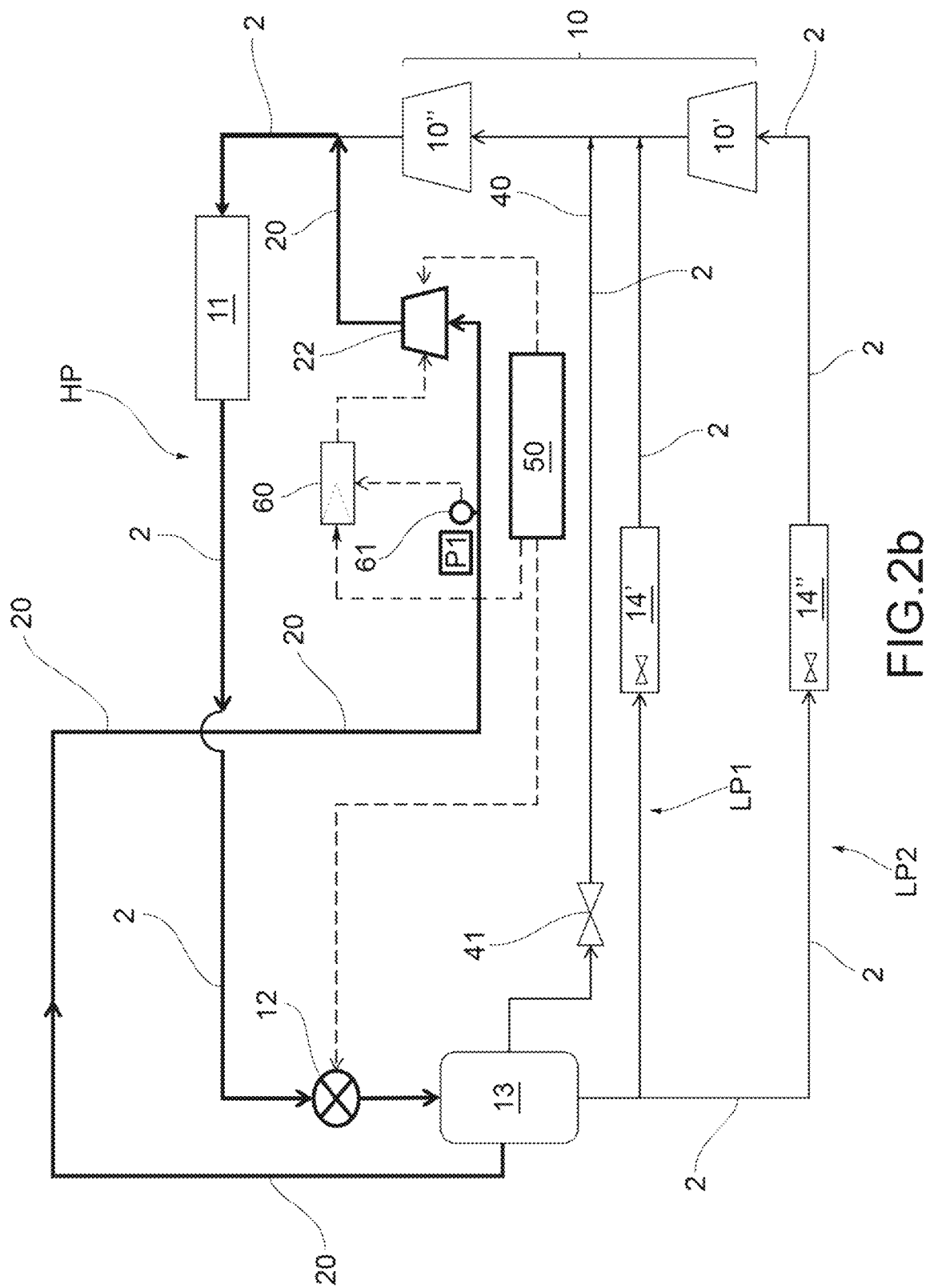

VAPOR COMPRESSION REFRIGERATION SYSTEM CAPABLE OF OPERATING IN TRANSCRITICAL MODE AND METHOD OF OPERATING SUCH A SYSTEM

CROSS-REFERENCE TO RELATED APPLICATION

This application claims priority to and benefit of Italian Patent Application No. 102020000003019, filed Feb. 14, 2020, the contents of which are incorporated by reference in their entirety.

FIELD OF THE INVENTION

The present invention relates to a vapor compression refrigeration system and to a method of operating such a system.

The refrigeration system and the operating method according to the present invention find particular application in the commercial and industrial refrigeration field.

The refrigeration system of the present invention is capable of operating both in subcritical mode as well as in transcritical mode, according to the needs of the refrigeration system. Preferably, R744 refrigerant ($CO_2$) is used as refrigerant. The refrigeration system may be of the booster or non-booster type.

BACKGROUND OF THE INVENTION

One of the issues following the introduction of refrigeration systems capable of operating in a transcritical mode, characterized by the use of R744 refrigerant ($CO_2$), is the increase in operating pressures. In fact, R744 refrigerant is characterized by the peculiarity of having a high saturation pressure at ambient temperature, even higher than the operating pressure of a part of the plant.

Therefore, one of the issues of this type of plants, is maintenance of refrigerant inside the circuits in the event of interruption of the normal refrigeration cycle, due, for example, to a black-out or deriving from the need to disconnect the system for maintenance activities.

During plant downtime, in fact, the refrigerant inside the system continues to exchange heat with the outside, increasing in temperature and, therefore, in pressure. Once predefined pressure values are exceeded, the safety valves release refrigerant into the environment to contain pressure increase. When the issue that caused the shutdown is solved, the system may be lacking the necessary quantity of refrigerant for correct restart or operation thereof.

The component of the refrigeration system most affected by this issue is the main liquid receiver placed downstream of the gas cooler, due to the large quantity of refrigerant in liquid state stored therein.

FIG. 1 shows a simplified diagram of a refrigeration system, in which A indicates the gas cooler or condenser, B the expansion member upstream of the receiver, C the liquid receiver, D1 and D2 two evaporators in parallel, E1 and E2 two compression stages.

In transcritical refrigeration applications there are various solutions to this type of criticality. The most established ones, which define the state of the art, are the following:

increasing safety pressure of the system components;

using external condensing units, connected to a dedicated uninterruptible power supply (UPS), which are activated above predefined pressure thresholds, so as to keep the temperature (and therefore the pressure) of the refrigerant inside the liquid receiver constant, as shown in FIG. 1.

More in detail, as shown in FIG. 1, the refrigeration circuit of the condensing unit is a circuit, which is mechanically separated from the circuit containing $CO_2$, and comprises a condenser H, an expansion member I, an evaporator F, and a compressor G. The circuit of the condensing unit uses refrigerants other than $CO_2$ and usually synthetic refrigerants. The circuit of the refrigeration system containing $CO_2$ interfaces with the circuit connected to the condensing unit by the heat exchanger F, for example, a plate heat exchanger. When the condensing unit is activated by means of a pressure or temperature threshold, the side of the plate exchanger F connected to the condensing unit works as a normal evaporator, cooling $CO_2$ present on the other side of the plate exchanger. The result of heat exchange is to subtract heat entered into the tank from the surrounding environment, stopping passage of $CO_2$ from liquid to gaseous state to avoid pressure increase inside the liquid receiver.

Both solutions are effective but have side effects.

An increase in safety pressure of the system components involves, in fact, an increase in plant costs, as well as maintenance difficulties, due to the difficulty to find different components with higher safety pressures and to the increase in the skills required to maintenance personnel in the event of intervention on the circuit.

The use of condensing units usually involves the use-of a synthetic refrigerant within a system, which is characterized, instead, by the use of natural refrigerants ($CO_2$). Flammable natural refrigerants (usually R290) have been proposed on the market as an alternative solution to synthetic refrigerants. However, they are dangerous, especially in maintenance situations in which an open flame for brazing and welding is commonly used. Both solutions involve using a refrigerant, which is different from the one used in the main refrigerant circuit, thus increasing maintenance complexity.

In the field of commercial and industrial refrigeration, therefore, the need is felt for vapor compression refrigeration systems, capable of operating even in a transcritical mode, which allow to manage criticalities associated to the increase in refrigerant pressure following plant downtimes, without necessarily increasing safety pressure of system components and/or without having to use external condensing units to cool the liquid receiver.

SUMMARY OF THE INVENTION

Therefore, it is an object of the present invention to eliminate or at least mitigate the drawbacks of the prior art, by providing a vapor compression refrigeration system, capable of operating in a transcritical mode and managing criticalities associated to refrigerant pressure increases following plant downtimes, without necessarily increasing safety pressure of system components and/or having to use external condensing units to cool the liquid receiver.

It is another object of the present invention to provide a vapor compression refrigeration system, capable of operating also in a transcritical mode, which is simple to manufacture, and with plant costs comparable to conventional plants.

It is a further object of the present invention to provide a vapor compression refrigeration system, capable of operating also in a transcritical mode, which is reliable and operatively simple to manage.

It is a still further object of the present invention to provide a vapor compression refrigeration system and a method of operating such a system.

BRIEF DESCRIPTION OF THE DRAWINGS

The technical features of the invention according to the aforesaid objects may be clearly found in the contents of the claims hereinbelow. Advantages thereof will become more apparent from the following detailed description, given with reference to the accompanying drawings which show one or more embodiments merely given by way of non-limiting example, in which:

FIG. 1 shows a simplified diagram of a vapor compression refrigeration system of the conventional type, equipped with an external condensing unit;

FIG. 2b shows a simplified diagram of a variant of the refrigeration system according to the invention, shown in FIG. 2a;

FIG. 3b shows a simplified diagram of a variant of the refrigeration system according to the invention, shown in FIG. 3a;

Elements or parts in common to the embodiments described will be indicated hereinafter by the same reference numerals.

DETAILED DESCRIPTION

Figure 2A:
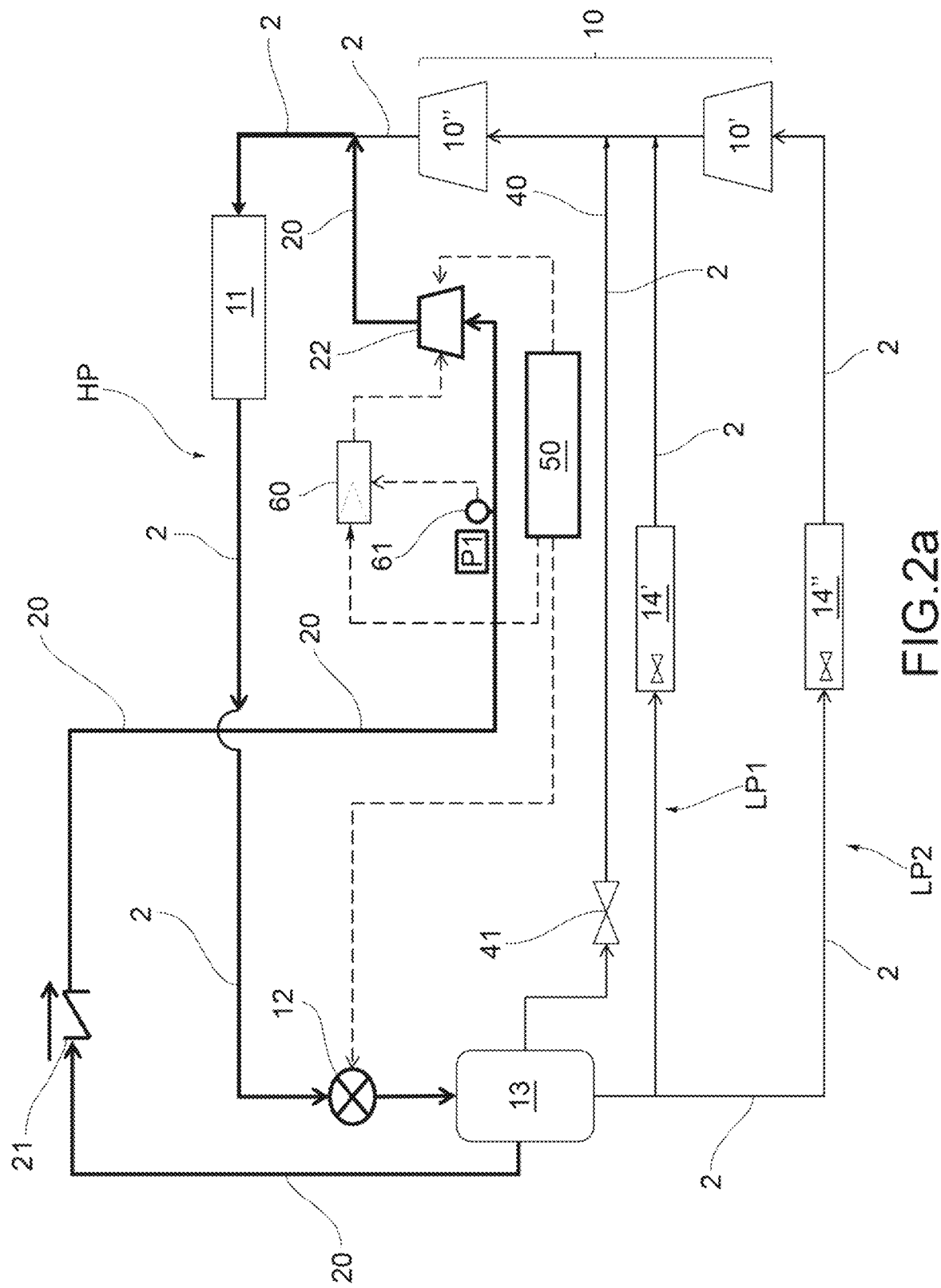
FIG. 2a shows a simplified diagram of a vapor compression refrigeration system according to a first embodiment of the present invention.

With reference to the accompanying Figures, reference numeral 1 indicates a refrigeration system according to the present invention.

The refrigeration system 1 operates according to a vapor compression cycle and is capable of operating both in a transcritical mode as well as in a subcritical mode.

Preferably, the refrigeration system uses R744 (CO2) as refrigerant fluid. Alternatively, the refrigeration system may use as refrigerant a mixture of transcritical refrigerants with low or very low Global Warming Potential (GWP), possibly containing CO2. A refrigeration system is said to be transcritical if it operates with pressures which exceed the critical pressure Pc of the working fluid. The peculiarity of thermodynamic cycles is that there is no phase transition from gas to liquid in at least one of the heat exchange processes. In that section of the plant the fluid behaves like a dense gas.

According to a general embodiment of the present invention, the refrigeration system 1 comprises a main refrigerant circuit 2, which comprises:

a primary compressor group 10;

a gas cooler or condenser 11 placed downstream of the primary compressor group 10;

an expansion device 12 placed downstream of the gas cooler or condenser 11;

a liquid receiver 13 placed downstream of the expansion device 12; and at least one evaporator 14'; 14" placed downstream of the liquid receiver 13 and upstream of the primary compressor group 10.

Advantageously, downstream of the liquid receiver 13 and upstream of the primary compressor group 10, the refrigeration system 1 may be equipped with two or more evaporators 14', 14" or with two or more groups of evaporators, connected in parallel.

Advantageously each of the evaporators, or groups of evaporators, may be equipped with own secondary expansion members and control devices.

As shown in the accompanying Figures, in the main refrigerant circuit 2 it is possible to identify:

a high pressure branch HP, which extends from the delivery of the primary compressor group 10 to the expansion device 12; and one or more low pressure branches LP1, LP2, which extend from the expansion device 12 up to a suction of the primary compressor group 10. Advantageously, as shown in the accompanying Figures, the primary compressor group 10 may comprise two or more compression stages 10' 10" connected in series.

Each compression stage may consist of separate compressors or it may be integrated in a single compressor.

Figure 5:
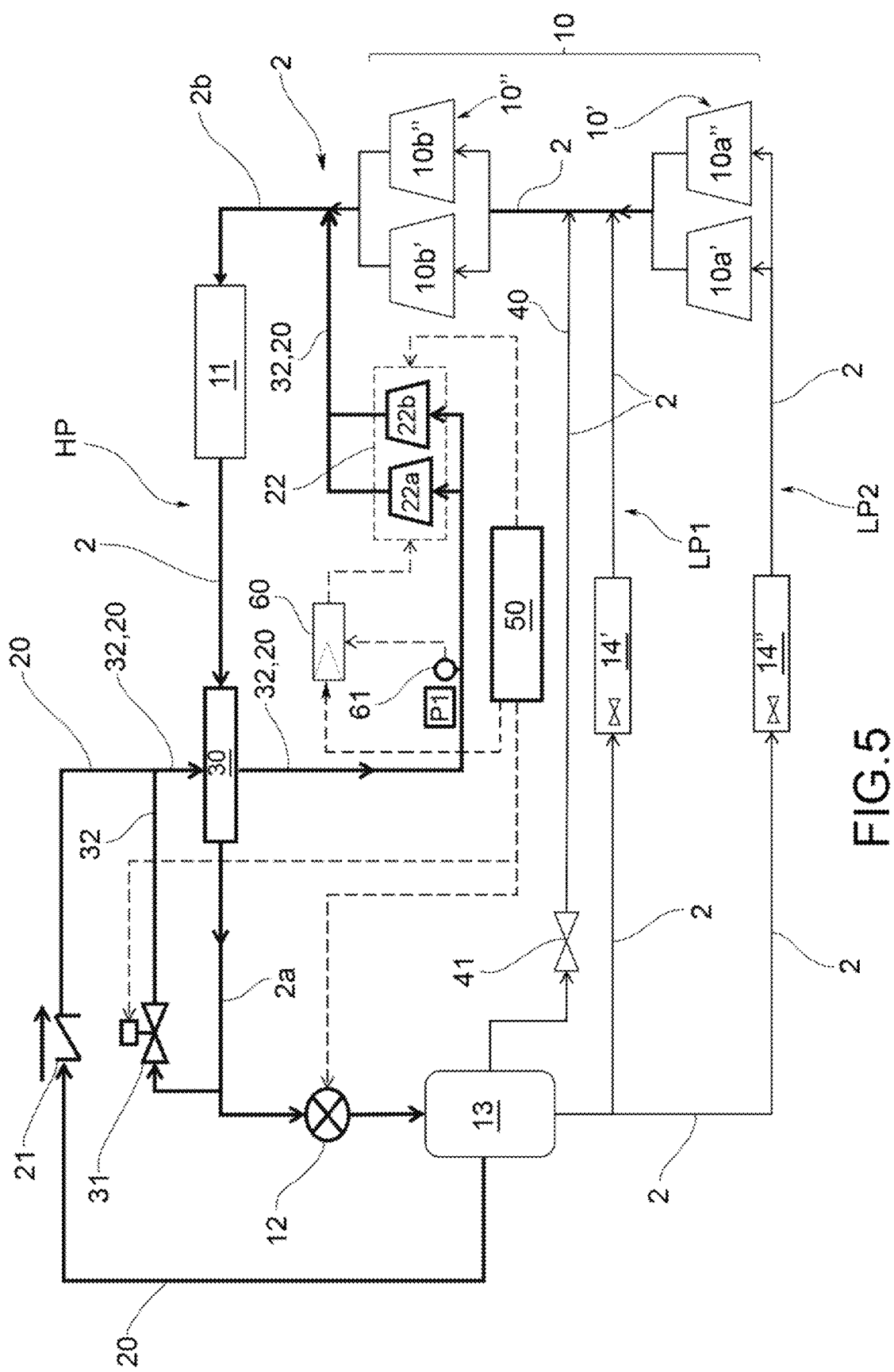
FIG. 5 shows a simplified diagram of a variant of the refrigeration system according to the invention, shown in FIG. 4, in which the compressor groups consist of two or more compressors in parallel.

Advantageously, as shown in FIG. 5, the primary compressor group 10 may comprise at least one compression stage defined by two or more compressors 10a', 10a" or 10b', 10b", connected in parallel.

The refrigeration system 1 may comprise a single evaporator or a group of evaporators connected in parallel in the same suction line, or, as shown in the accompanying Figures, it may comprise one or more evaporators or groups of evaporators 14', 14", which preferably operate at different evaporation levels.

Preferably, if there are two or more evaporators 14', 14" operating at different evaporation levels, they are connected in suction to different compression stages 10' and 10" of the primary compressor group 10.

As shown in the accompanying Figures, the refrigeration system 1 may be configured as a booster system. A booster system is configured when compressors of a lower evaporation level discharge in the suction of compressors of a higher evaporation level, i.e., compressors of at least two evaporation levels are connected in series.

Alternatively, the refrigeration system 1 may be configured as a non-booster system. A non-booster system is configured when compressors of a lower evaporation level discharge in the same branch as compressors of a higher evaporation level, i.e., compressors of at least two evaporation levels are connected in parallel to the discharge.

As shown in the accompanying Figures, the liquid receiver 13 may be fluidically connected in suction to a compression stage of the primary compressor group 10 via a connection duct 40 equipped with a control valve 41. Such a connection allows to remove flash gas present in the liquid receiver 13, which is created due to an expansion in the expansion device 12.

In accordance with the present invention, the refrigeration system 1 further comprises a duct 20 for emergency circulation of the refrigerant fluid. As shown in the accompanying Figures, the emergency circulation duct 20 fluidically connects the liquid receiver 13 to the main refrigerant circuit 2 upstream of the gas cooler or condenser 11, by-passing the at least one evaporator 14', 14" and the primary compressor group 10, to allow, during an emergency, a flow of refrigerant from the liquid receiver 13 to the gas cooler or condenser 11.

Still in accordance with the present invention, the refrigeration system 1 further comprises an emergency compressor group 22 placed in the emergency circulation duct 20 of the refrigerant. Operatively, the emergency compressor group 22 may be activated in the presence of pressure values—inside the liquid receiver 13 or in the section of duct 20 upstream of the emergency compressor group 22—equal or higher than a predefined emergency pressure threshold P1, which is lower than a predefined safety pressure of the liquid receiver 13.

According to the present invention, the refrigeration system 1 comprises an uninterruptible power supply 50 (UPS) adapted to electrically power at least the emergency compressor group 22 and the expansion device 12 in the event of a shutdown of the refrigeration system 1.

Operatively, in the event of a shutdown of the refrigeration system, the devices or components of the system which are not powered by the uninterruptible power supply 50, in particular, the primary compressor group 10, are deactivated. As already explained above, this causes a block of the circulation of the refrigerant fluid in the main refrigerant circuit 2 and, in particular, an accumulation of refrigerant fluid in the liquid receiver 13. Inevitably, due to heat exchange with the external environment, the refrigerant fluid contained in the liquid receiver 13 tends to heat up with a consequent increase in pressure. In the absence of external interventions, once the threshold of the safety pressure of the liquid receiver 13 is reached, vent valves intervene, discharging the refrigerant fluid into the external environment.

Conversely, by virtue of the present invention, in the event of a shutdown of the refrigeration system 1, when pressure inside the liquid receiver 13 or in the section of duct 20 for the emergency circulation of the refrigerant fluid upstream of the emergency compressor group 22 equals or exceeds the predefined emergency pressure threshold P1 (due to the absence of circulation of refrigerant fluid in the main refrigerant circuit 2), the emergency compressor group 22 is activated (powered by the uninterruptible power supply 50) and thus an emergency circulation of refrigerant fluid is activated from the liquid receiver 13 to the gas cooler or condenser 11 through the emergency circulation duct 20 and back to the liquid receiver 13 through the expansion device 12. Such an emergency circulation of the refrigerant fluid by-passes the at least one evaporator 14' and 14" and the primary compressor group 10.

By virtue of such an emergency circulation, even in the event of a shutdown of the refrigeration system 1, the refrigerant fluid continues to be cooled with the gas cooler or condenser 11. Thereby, pressure inside the liquid receiver 13 is kept below the safety pressure threshold.

Unlike the solutions proposed in the prior art, the refrigeration system 1 according to the present invention is capable of managing criticalities associated to refrigerant fluid pressure increases following plant downtimes without necessarily having to increase the safety pressure of the components of the system and/or without having to use external condensing units to cool the liquid receiver. In fact, the components (emergency duct 20 and emergency compressor group 22) designed to ensure the emergency circulation of the refrigerant fluid are fluidically integrated in the refrigeration system 1 and exploit the main refrigerant circuit 2 to allow such an emergency circulation.

From an operational point of view, during normal operation, the refrigeration system 1 is substantially unaffected by the presence of the emergency circulation duct 20 and the emergency compressor group 22. In fact, when the emergency compressor group 22 is deactivated, there is no circulation of refrigerant fluid in the emergency circulation duct 20. At most, infiltrations of refrigerant fluid may occur inside the emergency circulation duct 20, due to fluid leakage through the emergency compressor group 22 and consequent pressure increases in the emergency circulation duct. However, the refrigeration system 1 is capable of absorbing such events.

Advantageously, as shown in FIGS. 2a, 3a, 4 and 5, in order to limit the influence of the emergency circulation duct 20 on the main refrigerant circuit 2, the refrigeration system 1 may comprise a non-return valve 21 placed in the emergency circulation duct 20 of the refrigerant fluid. The non-return valve 21 is configured to open in the presence of a higher upstream pressure than the downstream pressure, so as to ensure the emergency operation of the system in the event of a shutdown of the system itself.

Preferably, as shown in the accompanying Figures, the non-return valve 21 is placed in the emergency circulation duct 20 of refrigerant upstream of the emergency compressor group 22. According to embodiments not shown in the accompanying Figures, the non-return valve 21 may be placed downstream of the emergency compressor group 22.

Preferably, as shown in the accompanying Figures, the non-return valve 21 is of the mechanical type. Thereby, an automatic intervention of the valve is obtained, operation of the valve being independent of availability of electrical power. The refrigeration system 1 is thus simplified both from the plant engineering point of view and the control point of view.

Alternatively, the non-return valve 21 may consist of a regulation solenoid valve or an ON-OFF solenoid valve, preferably of the electronic type, controlled in opening and closing so as to intervene in coordination with the emergency compressor group 22. In this case, the uninterruptible power supply 50 must also be adapted to electrically power the non-return valve 21. The flexibility of the refrigeration system is increased at the expense of plant and control simplicity.

Preferably, as shown in the accompanying Figures, the emergency compressor group 22 is activated and deactivated by a controller 60 according to the pressure values detected by at least one pressure sensor 61 which is adapted to detect pressure inside the liquid receiver 13 or in the emergency circulation duct 20 upstream of the emergency compressor group 22. The uninterruptible power supply 50 is also adapted to electrically power the controller 60 in the event of shutdown of the refrigeration system 1.

Preferably, the controller 60 is configured to control the emergency compressor group 22 so that it maintains a specific working set point in suction.

The emergency compressor group 22 may have any configuration. In particular, it may consist of a single compressor with one or more compression stages. According to a possible alternative embodiment, shown in FIG. 5, the emergency compressor group 22 may comprise at least one compression stage defined by two or more compressors 22a, 22b, connected in parallel.

Figure 3A:
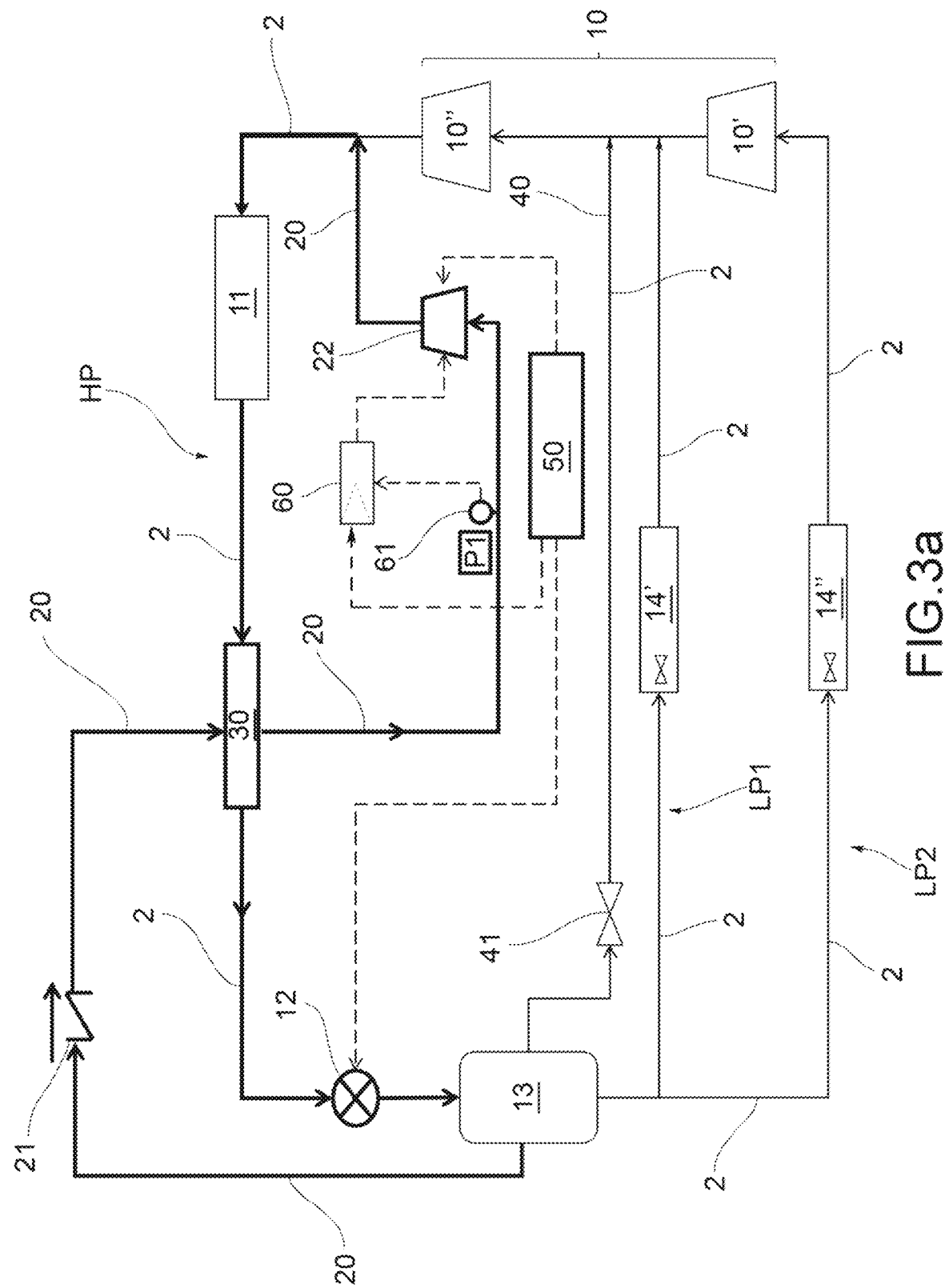
FIG. 3a shows a vapor compression refrigeration system according to a second embodiment of the present invention.
Figure 3B:
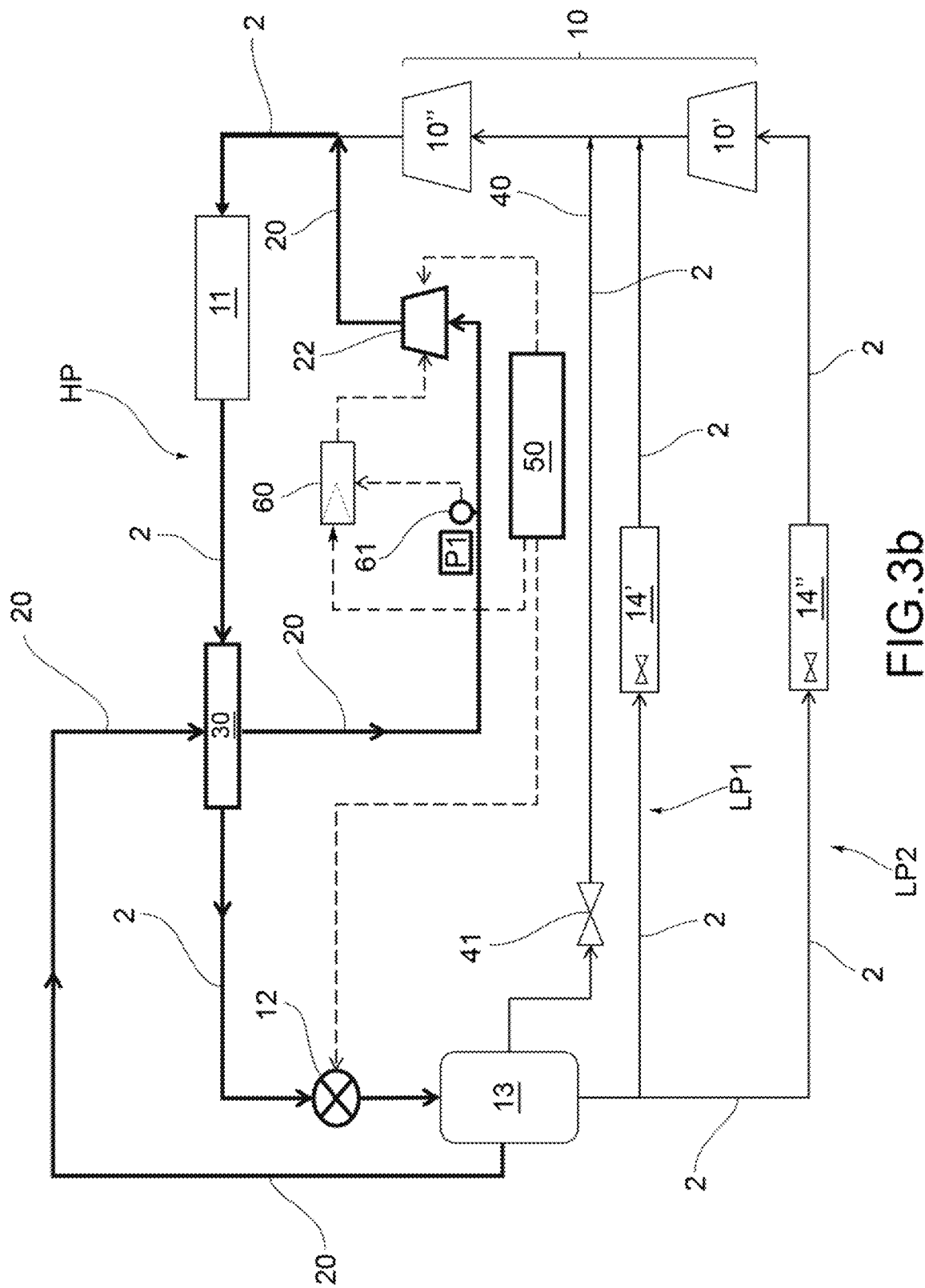
Figure 4:
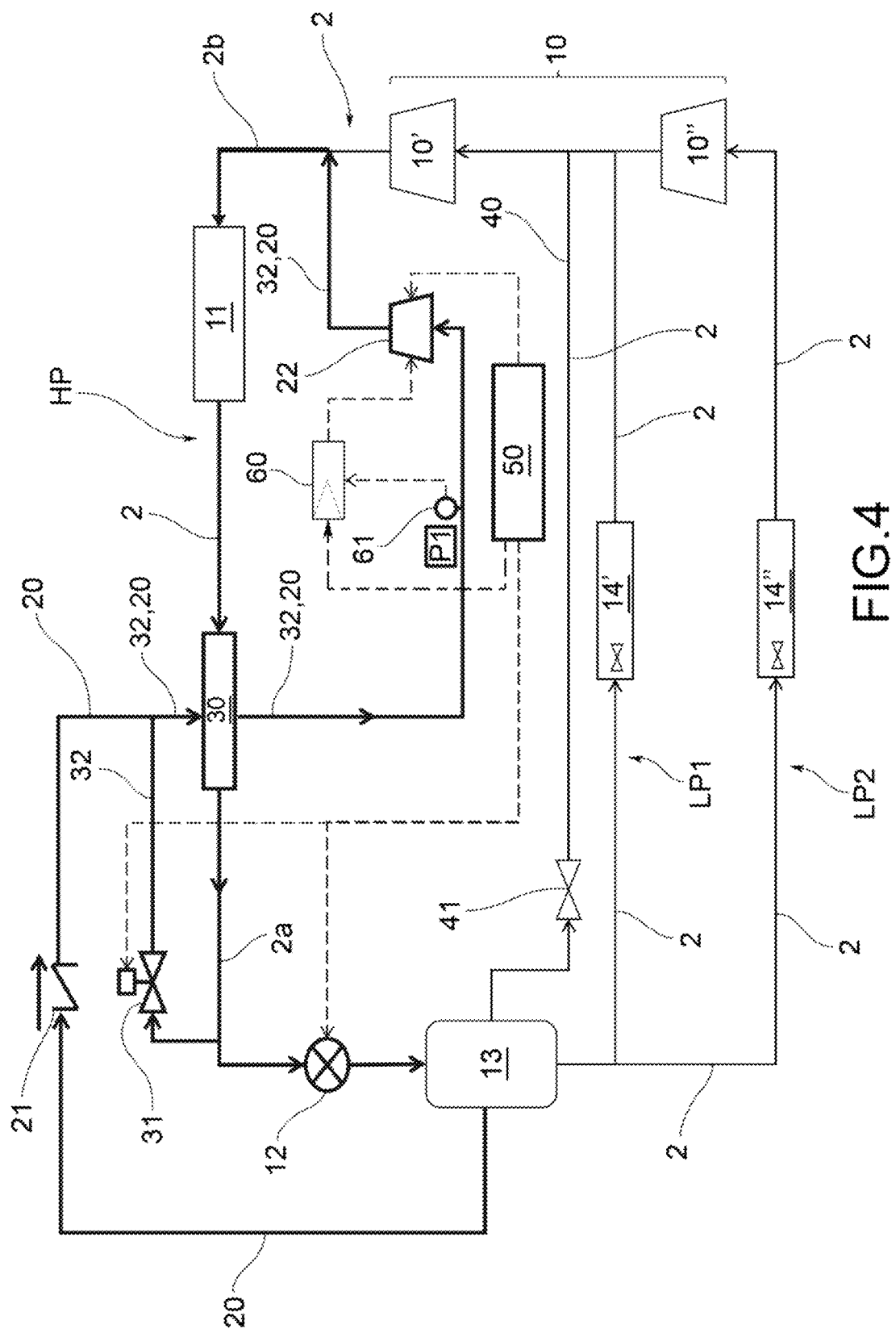
FIG. 4 shows a simplified diagram of a vapor compression refrigeration system according to a third embodiment of the present invention.

Advantageously, as shown in FIGS. 3a and 3b and in FIGS. 4 and 5, the refrigeration system 1 may comprise an emergency refrigerant/refrigerant heat exchanger 30, which:

on a first side is fluidically inserted in a section of the main refrigerant circuit 2 between the gas cooler or condenser 11 and the expansion device 12 to be crossed by the entire flow of refrigerant in output from the gas cooler or condenser 11; and on a second side is fluidically inserted in the emergency circulation duct 20 to be crossed by the flow of refrigerant extracted from the liquid receiver 13.

By virtue of the presence of the emergency refrigerant/refrigerant heat exchanger 30, in the event of a shutdown of the refrigeration system 1 and activation of the emergency circulation, the flow of refrigerant fluid from the gas cooler or condenser 11 towards the liquid receiver 13 may be further cooled by using heat exchange with the flow of refrigerant fluid expanded in the expansion device 12 and recirculated to the gas cooler or condenser 11.

In accordance with the embodiments shown in FIGS. 3*a* and 3*b*, the emergency refrigerant/refrigerant heat exchanger 30 is used only in case of a shutdown of the refrigeration system, i.e., in the presence of an emergency circulation of the refrigerant fluid, and not during normal operation of the refrigeration system.

Conversely, as explained hereinbelow, in accordance with the embodiments shown in FIGS. 4 and 5, the emergency refrigerant/refrigerant heat exchanger 30 may also be operatively used during normal operation of the refrigeration system and not only during emergency operation.

Preferably, as shown in FIGS. 4 and 5, the refrigeration system 1 may comprise a secondary refrigerant/refrigerant heat exchanger 30.

On a first side, the secondary refrigerant/refrigerant heat exchanger 30 is fluidically inserted in a section of the main refrigerant circuit 2 between the gas cooler or condenser 11 and the expansion device 12 to be crossed by the entire flow of refrigerant in output from the gas cooler or condenser 11.

On a second side, the secondary refrigerant/refrigerant heat exchanger 30 is fluidically inserted in a branch duct 32 connecting a section 2*a* of the main refrigerant circuit 2 between the refrigerant/refrigerant heat exchanger 30 and the expansion device 12 to a section 2*b* of the main refrigerant circuit 2 between the primary compressor group 10 and the gas cooler or condenser 11.

An expansion valve 31 is installed in the branch duct 32, upstream of the secondary refrigerant/refrigerant heat exchanger 30, and a secondary compressor group 22 is installed downstream of the secondary refrigerant/refrigerant heat exchanger 30.

Preferably, the expansion valve 31 is an electronic valve.

Operatively, during the normal (non-emergency) operation of the refrigeration system 1, the secondary refrigerant/refrigerant heat exchanger 30, the branch duct 32, the expansion valve 31 and the secondary compressor group 22 configure a sub-cooling circuit of the main flow of refrigerant fluid in output from the gas cooler or condenser 11 by heat exchange with a portion of the main flow of refrigerant expanded through the expansion valve 31 (and therefore colder) and recirculated to the gas cooler or condenser 11 through the secondary compressor group 22.

Preferably, the expansion valve 31 is controlled so that a constant degree of superheating of the gas in input to the secondary compressor group 22 is maintained. The superheating is obtained by comparing pressure and temperature of the gas in input to the suction side of the secondary compressor group 22 with special sensors.

Such a sub-cooling circuit allows to increase the efficiency of the refrigeration system 1, in particular, in the transcritical mode.

Furthermore, such a sub-cooling circuit may be used to extend the transcritical mode operation of the refrigeration system 1 (using, in particular, CO2 as the refrigerant fluid) in extreme environmental conditions and whenever the level of refrigeration capacity required makes it energetically convenient to activate the sub-cooling.

According to an embodiment not shown in the accompanying Figures, the aforesaid sub-cooling circuit is completely distinct from the emergency circulation duct 20 and does not intervene in the emergency operation of the refrigeration system 1.

According to a preferred embodiment of the present invention, shown in FIGS. 4 and 5, the emergency circulation duct 20 is at least partially integrated in the sub-cooling circuit, having a part of the components in common therewith, as better described hereinafter.

More in detail, as shown in FIGS. 4 and 5, the emergency circulation duct 20 of the refrigerant:

flows into the branch duct 32 downstream of the expansion valve 31 and upstream of the secondary refrigerant/refrigerant heat exchanger 30, and coincides with the branch duct 32 in the section of the branch duct 32 which extends from the secondary refrigerant/refrigerant heat exchanger 30 to the gas cooler or condenser 11.

In accordance with such a preferred plant configuration, the emergency compressor group 22 coincides with the secondary compressor group and the emergency refrigerant/refrigerant heat exchanger 30 coincides with the secondary refrigerant/refrigerant heat exchanger.

In accordance with such a preferred plant configuration, the refrigeration system 1 may preferably comprise a non-return valve 21 placed in the section of the emergency circulation duct 20 of the refrigerant, as already described above. In the specific case, the non-return valve 21 is placed in the section of the emergency circulation duct 20 of the refrigerant upstream of the point of confluence in the branch duct 32. Operatively, the function of the non-return valve 21 is to allow, during normal operation, the secondary compressor group 22 and the heat exchanger 30 to operate at higher pressures than those present in the liquid receiver 13. In such a situation, in fact, the pressure upstream of the non-return valve 21, greater than that downstream, closes the flow in the duct 20 making it inoperative. The advantage thus obtained is the possibility, during normal operation, of optimizing pressure and, therefore, evaporation temperature present in the heat exchanger 30 so as to achieve a greater efficiency of heat exchange and performance of the refrigeration system 1.

Still in accordance with such a preferred plant configuration, preferably, the uninterruptible power supply 50 may also be adapted to electrically power the expansion valve 31 in the event of a shutdown of the refrigeration system 1. Thereby, in the event of a shutdown of the refrigeration system, it is possible to close or open the expansion valve 31 in a regulated manner according to the requirements of the refrigeration system 1 during operation in emergency conditions. In particular, this allows the emergency circulation to be activated even before the pressure of the liquid receiver 13 reaches the pressure level for opening the non-return valve 21, optimizing the refrigeration efficiency and thus extending the effectiveness of the energy reserve present in the uninterruptible power supply 50 (UPS) over time.

With respect to the embodiments shown in FIGS. 2*a-b* and 3*a-b*, the preferred embodiment shown in FIGS. 4 and 5 allows a more complete operational integration of the emergency circuit in the refrigeration system 1. In fact, in such a plant configuration, the main (and more expensive) components installed in the emergency circulation duct 20 of the refrigerant fluid (i.e., the emergency compressor group 22 and emergency refrigerant/refrigerant heat exchanger 30) may also be used during normal operation of the refrigeration system 1, being integrated in the sub-cooling circuit.

In accordance with the aforesaid preferred embodiment, it is therefore possible to have a vapor compression refrigeration system, capable of operating even in a transcritical mode, which, in addition to being able to autonomously inhibit refrigerant fluid rising pressure phenomena during shutdown steps of the system itself, may increase the operating efficiency thereof, in particular in a transcritical mode, as well as extend the transcritical operation thereof in extreme environmental conditions (above +40° C.).

The method of operating the refrigeration system 1 according to the present invention will now be described.

For simplicity's sake, the description of the refrigeration system 1 will not be repeated, and reference will be made to the description previously provided.

The method of operating the refrigeration system 1 according to the present invention comprises, in the event of a shutdown of the refrigeration system, at least the following operating steps:

(a) activating the uninterruptible power supply 50, to electrically power at least the emergency compressor group 22 and the expansion device 12; and (b) activating the emergency compressor group 22 when the pressure inside the liquid receiver 13 or in the section of the emergency circulation duct 20 of the refrigerant fluid upstream of said emergency compressor group 22 equals or exceeds the aforesaid predefined emergency pressure threshold P1.

The activation of the emergency compressor group 22 activates an emergency circulation of refrigerant fluid from the liquid receiver 13 to the gas cooler or condenser 11 through the emergency circulation duct 20 and back to the liquid receiver 13 through the expansion device 12.

By virtue of such an emergency circulation, the refrigerant fluid, which, in the absence of the intervention of the primary compressor group 10, is accumulating and heating in the liquid receiver 13, is extracted from the liquid receiver 13 and cooled by the gas cooler or condenser 11, thus keeping pressure inside the liquid receiver 13 below the predefined safety pressure of the liquid receiver 13.

In the preferred case in which the refrigeration system 1 comprises a sub-cooling circuit and the emergency circulation duct 20 of the refrigerant fluid, with the corresponding components, is integrated with the sub-cooling circuit (as shown in particular in FIGS. 4 and 5), the operating method includes that in operating step (a) the expansion valve 31 is also electrically powered by the uninterruptible power supply 50.

In such a case, preferably, the operating method comprises a step (c) of closing the expansion valve 31 before the step (b) of activating the emergency compressor group 22, so that, following the activation of the emergency compressor group 22, the entire flow of refrigerant fluid in output from the first side of the emergency refrigerant/refrigerant heat exchanger 30 is recirculated to the liquid receiver 13 passing through the expansion device 12.

As an alternative to step (c) of closing the expansion valve 31, the operating method may comprise a step (d) of opening the expansion valve 31 in a regulated manner before, or simultaneously with, the step (b) of activating the emergency compressor group 22, so that, following the activation of the emergency compressor group 22, a part of the flow of refrigerant fluid in output from the first side of the emergency refrigerant/refrigerant heat exchanger 30 is recirculated to the second side of the emergency refrigerant/refrigerant heat exchanger 30 passing through said expansion valve.

Preferably, the expansion valve 31, powered by the uninterruptible power supply 50, is regulated in the opening thereof to keep a predefined superheat at the output of the heat exchanger 30 (on the suction side of the emergency compressor group 22). The expansion valve 31 allows to better regulate evaporation in the exchanger 30 so as to optimize the operation of the emergency circulation system 22.

The present invention allows to obtain numerous advantages which have been explained in the description.

The vapor compression refrigeration system according to the present invention, capable of operating in a transcritical mode, is capable of managing criticalities associated with increases in refrigerant pressure following plant shutdowns without necessarily increasing the safety pressure of the system components and/or without having to use external condensing units to cool the liquid receiver.

The refrigeration system according to the present invention is constructively simple to manufacture, with installation costs comparable to those of conventional systems.

The refrigeration system according to the present invention is reliable and operatively simple to manage.

Therefore, the invention thus conceived achieves the intended purposes.

Obviously, in the practical embodiment thereof, it may also take other shapes and configurations from that shown above, without departing from the present scope of protection.

Moreover, all details may be replaced by technically equivalent elements, and any size, shape, and material may be used according to the needs.

What is claimed is:

1. A vapor compression refrigeration system, capable of operating in transcritical mode, the vapor compression refrigeration system comprising a main refrigeration circuit which comprises:

a primary compressor group;

a gas cooler or condenser placed downstream of said primary compressor group;

an expansion device placed downstream of said gas cooler or condenser;

a liquid receiver placed downstream of said expansion device; and at least one evaporator placed downstream of said liquid receiver and upstream of said primary compressor group, wherein the vapor compression refrigeration system further comprises:

an emergency circulation duct of a refrigerant that fluidically connects said liquid receiver to the main refrigeration circuit upstream of said gas cooler or condenser by-passing said at least one evaporator and said primary compressor group to allow a flow of refrigerant from said liquid receiver to the gas cooler or condenser; and an emergency compressor group placed in said emergency circulation duct of the refrigerant and activatable in the presence of pressure values, inside said liquid receiver or in a section of the emergency circulation duct upstream of said emergency compressor group, equal or higher than a predefined emergency pressure threshold that is lower than a predefined safety pressure of the liquid receiver;

and wherein the vapor compression refrigeration system further comprises an uninterruptible power supply suitable to electrically power at least said emergency compressor group and said expansion device in the event of a shutdown of the vapor compression refrigeration system, so that, in the event of a shutdown of the refrigeration system, when pressure inside said liquid receiver or in the section of the emergency circulation duct upstream of said emergency compressor group equals or exceeds said predefined emergency pressure threshold, an emergency circulation of refrigerant fluid is activated from said liquid receiver to said gas cooler or condenser through said emergency circulation duct and back to said liquid receiver through said expansion device.

2. The vapor compression refrigeration system of claim 1, further comprising a non-return valve placed in said emergency circulation duct of refrigerant, said non-return valve being configured to open in the presence of an upstream pressure higher than the downstream pressure.

3. The vapor compression refrigeration system of claim 2, wherein said non-return valve is mechanical.

4. The vapor compression refrigeration system of claim 2, wherein said non-return valve is placed in said emergency circulation duct of refrigerant, downstream of the emergency compressor group.

5. The vapor compression refrigeration system of claim 2, wherein said non-return valve is placed in said emergency circulation duct of refrigerant upstream of the emergency compressor group.

6. The vapor compression refrigeration system of claim 1, wherein said emergency compressor group is controlled by a controller according to pressure values detected by at least one pressure sensor suitable to measure pressure inside the liquid receiver or in the emergency circulation duct of the refrigerant upstream of the emergency compressor group and wherein said uninterruptible power supply is further suitable to electrically power also said controller in case of shutdown of the vapor compression refrigeration system.

7. The vapor compression refrigeration system of claim 1, further comprising an emergency refrigerant/refrigerant heat exchanger, which on a first side is fluidically inserted in a section of said main refrigerant circuit between said gas cooler or condenser and said expansion device to be crossed by an entire flow of refrigerant in output from said gas cooler or condenser; and
which on a second side is fluidically inserted in said emergency circulation duct to be crossed by the flow of refrigerant extracted from the liquid receiver.

8. The vapor compression refrigeration system of claim 1, comprising a secondary refrigerant/refrigerant heat exchanger, which on a first side is fluidically inserted in a section of said main refrigerant circuit between said gas cooler or condenser and said expansion device to be crossed by the entire flow of refrigerant output from said gas cooler or condenser; and
which on a second side is fluidically inserted in a branch duct connecting a section of said main refrigerant circuit between said secondary refrigerant/refrigerant heat exchanger and said expansion device to a section of said main refrigerant circuit between said primary compressor group and said gas cooler or condenser,
wherein an expansion valve is installed in said branch duct upstream of said secondary refrigerant/refrigerant heat exchanger and a secondary compressor group is installed downstream of said secondary refrigerant/refrigerant heat exchanger, and
wherein said secondary refrigerant/refrigerant heat exchanger, said branch duct, said expansion valve and said secondary compressor group configure a sub-cooling circuit of a main flow of refrigerant in output from said gas cooler or condenser by heat exchange with a portion of the main flow of refrigerant expanded through said expansion valve and recirculated to the gas cooler or condenser through said secondary compressor group.

9. The vapor compression refrigeration system of claim 8, further comprising a non-return valve placed in said emergency circulation duct of refrigerant, wherein said non-return valve is placed in said emergency circulation duct of refrigerant, downstream of the emergency compressor group, the vapor compression refrigeration system further comprising an emergency refrigerant/refrigerant heat exchanger, which on a first side is fluidically inserted in a section of said main refrigerant circuit between said gas cooler or condenser and said expansion device to be crossed by an entire flow of refrigerant in output from said gas cooler or condenser, and on a second side is fluidically inserted in said emergency circulation duct to be crossed by the flow of refrigerant extracted from the liquid receiver, and wherein said emergency circulation duct of the refrigerant flows into the branch duct downstream of said expansion valve and upstream of said secondary refrigerant/refrigerant heat exchanger and coincides with said branch duct in a section of the branch duct extending from said secondary refrigerant/refrigerant heat exchanger to said gas cooler or condenser,
wherein said emergency compressor group coincides with said secondary compressor group and said emergency refrigerant/refrigerant heat exchanger coincides with said secondary refrigerant/refrigerant heat exchanger, and
wherein said non-return valve is placed in the section of the emergency circulation duct of the refrigerant upstream of a point of confluence in said branch duct.

10. The vapor compression refrigeration system of claim 9, wherein said uninterruptible power supply is further suitable to electrically power also said expansion valve in case of shutdown of the vapor compression refrigeration system, so that, in case of shutdown of the vapor compression refrigeration system, the expansion valve is openable or closable in a regulated manner according to needs of the vapor compression refrigeration system when operating in emergency conditions.

11. The vapor compression refrigeration system of claim 8, wherein said expansion valve is an electronic valve.

12. The vapor compression refrigeration system of claim 1, wherein said emergency compressor group comprises at least one compression stage defined by two or more compressors, connected in parallel.

13. The vapor compression refrigeration system of claim 1, wherein said primary compressor group comprises at least one compression stage defined by two or more compressors, connected in parallel.

14. The vapor compression refrigeration system of claim 1, wherein said primary compressor group comprises two or more compression stages connected in series.

15. The vapor compression refrigeration system of claim 1, comprising two or more evaporators or groups of evaporators, operating at a same level of evaporation or at different levels of evaporation.

16. The vapor compression refrigeration system of claim 15, wherein said two or more evaporators or groups of evaporators are connected in suction to a same compression stage of said primary compressor group or to different compression stages of said primary compressor group.

17. The vapor compression refrigeration system of claim 1, wherein said liquid receiver is fluidically connected in suction to a compression stage of said primary compressor group via a connection duct having a control valve.

18. The vapor compression refrigeration system of claim 1, wherein the refrigerant fluid is R744.

19. A method of operating a vapor compression refrigeration system, capable of operating in transcritical mode, the vapor compression refrigeration system comprising a main refrigeration circuit which comprises:
- a primary compressor group;
- a gas cooler or condenser placed downstream of said primary compressor group;
- an expansion device placed downstream of said gas cooler or condenser;
- a liquid receiver placed downstream of said expansion device; and
- at least one evaporator placed downstream of said liquid receiver and upstream of said primary compressor group, wherein the vapor compression refrigeration system further comprises:
- an emergency circulation duct of a refrigerant that fluidically connects said liquid receiver to the main refrigeration circuit upstream of said gas cooler or condenser by-passing said at least one evaporator and said primary compressor group to allow a flow of refrigerant from said liquid receiver to the gas cooler or condenser; and
- an emergency compressor group placed in said emergency circulation duct of the refrigerant and activatable in the presence of pressure values, inside said liquid receiver or in a section of the emergency circulation duct upstream of said emergency compressor group, equal or higher than a predefined emergency pressure threshold that is lower than a predefined safety pressure of the liquid receiver;

and wherein the vapor compression refrigeration system further comprises an uninterruptible power supply suitable to electrically power at least said emergency compressor group and said expansion device in the event of a shutdown of the vapor compression refrigeration system, so that, in the event of a shutdown of the refrigeration system, when pressure inside said liquid receiver or in the section of the emergency circulation duct upstream of said emergency compressor group equals or exceeds said predefined emergency pressure threshold, an emergency circulation of refrigerant fluid is activated from said liquid receiver to said gas cooler or condenser through said emergency circulation duct and back to said liquid receiver through said expansion device, the method comprising, in the event of shutdown of the refrigeration system, the following steps:

(a) activating said uninterruptible power supply to electrically power said emergency compressor group and said expansion device; and (b) activating said emergency compressor group when pressure inside said liquid receiver or in the section of duct upstream of said emergency compressor group equals or exceeds said predefined emergency pressure threshold, so as to activate an emergency circulation of refrigerant fluid from the liquid receiver to said gas cooler or condenser through said emergency circulation duct and back to the liquid receiver through said expansion device, wherein, thanks to said emergency circulation, the refrigerant fluid is extracted from said liquid receiver and cooled at the gas cooler or condenser, keeping pressure inside the liquid receiver below said predefined safety pressure of the liquid receiver.

20. The method of claim 19, wherein said vapor compression refrigeration system further comprises
- a secondary refrigerant/refrigerant heat exchanger, which on a first side is fluidically inserted in a section of said main refrigerant circuit between said gas cooler or condenser and said expansion device to be crossed by the entire flow of refrigerant in output from said gas cooler or condenser, and on a second side is fluidically inserted in a branch duct connecting a section of said main refrigerant circuit between said secondary refrigerant/refrigerant heat exchanger and said expansion device to a section of said main refrigerant circuit between said primary compressor group and said gas cooler or condenser; and
- a non-return valve placed in said emergency circulation duct of refrigerant, wherein an expansion valve is installed in said branch duct upstream of said secondary refrigerant/refrigerant heat exchanger and a secondary compressor group is installed downstream of said secondary refrigerant/refrigerant heat exchanger, said expansion valve being an electronic valve, wherein said secondary refrigerant/refrigerant heat exchanger, said branch duct, said expansion valve and said secondary compressor group configure a subcooling circuit of a main flow of refrigerant in output from said gas cooler or condenser by heat exchange with a portion of the main flow of refrigerant expanded through said expansion valve and recirculated to the gas cooler or condenser through said secondary compressor group, wherein said non-return valve is placed in said emergency circulation duct of refrigerant, downstream of the emergency compressor group, the vapor compression refrigeration system further comprising an emergency refrigerant/refrigerant heat exchanger, which on a first side is fluidically inserted in a section of said main refrigerant circuit between said gas cooler or condenser and said expansion device to be crossed by an entire flow of refrigerant in output from said gas cooler or condenser, and on a second side is fluidically inserted in said emergency circulation duct to be crossed by the flow of refrigerant extracted from the liquid receiver, wherein said emergency circulation duct of the refrigerant flows into the branch duct downstream of said expansion valve and upstream of said secondary refrigerant/refrigerant heat exchanger and coincides with said branch duct in a section of the branch duct extending from said secondary refrigerant/refrigerant heat exchanger to said gas cooler or condenser, wherein said emergency compressor group coincides with said secondary compressor group and said emergency refrigerant/refrigerant heat exchanger coincides with said secondary refrigerant/refrigerant heat exchanger, wherein said non-return valve is placed in the section of the emergency circulation duct of the refrigerant upstream of a point of confluence in said branch duct, wherein said uninterruptible power supply is further suitable to electrically power also said expansion valve in case of shutdown of the vapor compression refrigeration system, so that, in case of shutdown of the vapor compression refrigeration system, the expansion valve is openable or closable in a regulated manner according to needs of the vapor compression refrigeration system when operating in emergency conditions, and wherein step (a) provides for electrically powering by means of said uninterruptible power supply also said expansion valve, said method comprising a step (c) of closing said expansion valve before step (b) of activating said emergency compressor group, so that after activation of said emergency compressor group the entire flow of refrigerant fluid in output from the first side of the emergency refrigerant/refrigerant heat exchanger is recirculated to the liquid receiver passing through the expansion device-.

21. The method of claim 20, wherein as an alternative to step (c) of closing said expansion valve, said method comprises a step (d) of opening said expansion valve in a regulated manner before or at the same time as step (b) of activating said emergency compressor group, so that, following activation of said emergency compressor group a part of the flow of refrigerant fluid in output from the first side of the emergency refrigerant/refrigerant heat exchanger is recirculated to the second side of said emergency refrigerant/refrigerant heat exchanger passing through said expansion device.

* * * * *